United States Patent [19]

Sikorski et al.

[11] Patent Number: 5,035,871

[45] Date of Patent: Jul. 30, 1991

[54] PRODUCTION OF CONCENTRATED AQUEOUS POLYPHOSPHATE SOLUTIONS

[75] Inventors: Charles F. Sikorski, W. Trenton, N.J.; John W. DeMarco, Langhorne, Pa.

[73] Assignee: FMC Corporation, Philadelphia, Pa.

[21] Appl. No.: 539,244

[22] Filed: Jun. 18, 1990

[51] Int. Cl.$^5$ .............................................. C01B 25/41
[52] U.S. Cl. ..................................... 423/305; 423/315
[58] Field of Search ................................ 423/315, 305

[56] References Cited

U.S. PATENT DOCUMENTS

| | | | |
|---|---|---|---|
| 3,022,154 | 2/1962 | Potts et al. | 71/34 |
| 3,290,140 | 12/1966 | Young | 71/34 |
| 3,455,649 | 7/1969 | Bigot | 23/107 |
| 3,533,737 | 10/1970 | Farr et al. | 23/107 |
| 3,537,814 | 11/1970 | Farr et al. | 23/107 |
| 3,752,879 | 8/1973 | Cozza et al. | 423/315 |
| 3,775,534 | 11/1973 | Meline | 423/310 |
| 3,933,459 | 1/1976 | Moore et al. | 71/34 |
| 3,949,058 | 4/1976 | Young et al. | 423/313 |
| 4,276,273 | 6/1981 | McGilvery | 423/305 |
| 4,637,921 | 1/1987 | Sansing et al. | 423/315 |

FOREIGN PATENT DOCUMENTS

| | | |
|---|---|---|
| 1006041 | 3/1977 | Canada . |
| 1008334 | 4/1977 | Canada . |
| 1087961 | 10/1980 | Canada . |
| 777253 | 6/1957 | United Kingdom ................ 423/315 |

*Primary Examiner*—Wayne A. Langel
*Attorney, Agent, or Firm*—Robert D. Jackson; Frank Ianno

[57] ABSTRACT

A concentrated aqueous alkali metal polyphosphate solution is prepared by adding polyphosphoric acid having a $P_2O_5$ assay of about 82% to about 85% to a quantity of concentrated aqueous alkali metal hydroxide sufficient to neutralize the acid. The resulting polyphosphate solution is richer in pyrophosphate and tripolyphosphate moieties than the acid.

16 Claims, No Drawings

PRODUCTION OF CONCENTRATED AQUEOUS POLYPHOSPHATE SOLUTIONS

This invention relates to the production of concentrated aqueous polyphosphate solutions, particularly by the neutralization reaction of polyphosphoric acid and aqueous alkali metal bases.

Polyphosphates, in the form of their alkali metal salts, constitute a valuable class of industrial chemicals. Examples of the commercial application of polyphosphates include their utility in the manufacture of cleaning compositions and textile processing products, and in water treatment to remove hardness.

A polyphosphate is generally understood to consist of two or more phosphate molecules arranged primarily in a linear configuration although some cyclic derivatives may be present. Among the lower members of the series, the pyro- and tripolyphosphates are the most significant, particularly the sodium salts. The potassium salts are also important offering the advantage of higher solubility but at increased cost.

Generally speaking, only pyro- and tripolyphosphates of sodium and potassium are made commercially other than the polymeric phosphate glasses. Some of these are available on the market as Glass H ®, Hexaphos ® and Sodaphos ®.

At the present time, sodium and potassium phosphate products including the polyphosphate salts are supplied almost entirely in solid form, the exception being tetrapotassium pyrophosphate which is also sold as a 60% aqueous solution. There is, however, a growing demand, on the part of both manufacturers and users, for liquid polyphosphates owing to their ease of handling. For instance, liquid polyphosphates are more convenient to measure and meter than are solid formulations. And, of course, liquid polyphosphates, that is, aqueous polyphosphates undergo water dissolution much more readily than solid products.

It might be supposed that liquid sodium and potassium polyphosphate could be obtained as an aqueous solution by merely dissolving the salts in water. This direct approach though has not proved to be feasible due to the solubility limits of the polyphosphate salts, especially the sodium salts, which cannot be dissolved at concentrations much above about 20%. Conversely, solubility limits for many of the potassium polyphosphate salts occur at a much higher level. As previously noted herein, aqueous tetrapotassium pyrophosphate is produced at concentration of 60%. On the other hand, the corresponding tetrasodium pyrophosphate prepared under identical conditions will not exceed about 8%. The solubility limits for the sodium salts can be mitigated, however, by employing a blend of the sodium and potassium salts or by introducing the soluble potassium source into the sodium salt solution.

A further difficulty with the solids dissolution approach is that only a relatively few of the polyphosphate salts are manufactured or otherwise readily obtainable. In general, with the exception of the polyphosphate glasses, polyphosphate salts higher than the tripolyphosphates are unavailable. This is due mainly to the fact that the higher polyphosphates cannot be easily crystallized from solution or condensed by heating orthophosphates to dryness. Thus, if a solution of tetra-, penta- or higher polyphosphate is desired, it cannot be realized by the dissolution of solid salts.

A method of producing a concentrated aqueous polyphosphate solution that circumvents the solids dissolution problem is to form the solution in situ by reacting polyphosphoric acid with an aqueous solution of a basic alkali metal salt as disclosed in Canadian Patent Nos. 1,006,041, 1,008,334, 1,087,479 and 1,087,961. The basic alkali reactant is concentrated sodium or potassium hydroxide and the polyphosphoric acid has a $P_2O_5$ assay of 80% to 88%. In carrying out the neutralization reaction, separate streams of the polyphosphoric acid and the aqueous alkali are fed simultaneously into a reactor vessel provided with cooling means. Sufficient base is added to at least completely neutralize the acid; final pH is about 10 to 11.5.

According to the cited patents, the neutralization process described therein yields an aqueous polyphosphate salt mixture in which the distribution of polyphosphate species corresponds to that of the polyphosphoric acid. Thus, if the polyphosphoric acid is lacking in the lower polyphosphate moieties, so will the polyphosphate salts formed in the neutralization. As a consequence, the aqueous polyphosphate solutions would be deficient in the preferred pyrophosphate, tripolyphosphate, and tetrapolyphosphate anions.

It has now been discovered that concentrated aqueous polyphosphate solutions resulting from the neutralization reaction of a polyphosphoric acid and alkali metal base, can be formed having a higher concentration of lower polyphosphate species than the precursor polyphosphoric acid and a method for producing such polyphosphate solutions enriched in the lower polyphosphates constitutes the principal object and purpose of the invention.

The present invention arose out of the discovery that introducing polyphosphoric acid into concentrated aqueous alkali yields a much higher percentage of lower molecular weight polyphosphate moieties than were present in the polyphosphoric acid. Initially, the polyphosphate mixture consists almost entirely of pyrophosphate, tripolyphosphate and tetrapolyphosphate, the tripolyphosphate predominating. With addition of more acid, some of the higher polyphosphate began to appear, growing more numerous as the neutralization is continued. After the addition of acid is complete, there remains overall an aqueous solution of alkali metal polyphosphate salts much enriched in the lower polyphosphate species.

That the polyphosphate distribution of the neutralization reaction mixture could be changed to favor the lower members following the process of the invention is surprising. According to the conventional wisdom and thinking as typified by the cited patents, the distribution of polyphosphates in the neutralization mixture always coincides with that of the acid. In the patentee's technique for conducting the neutralization, separate streams of acid and alkali were bought into contact with another. There was no indication that reversing this procedure by adding the acid to all of the alkali as in the process of the invention would lead to an increase in the lower polyphosphate species in the reaction product.

In carrying out the process of the invention, the polyphosphoric acid is introduced into a vessel of the aqueous alkali while maintaining thorough mixing of the reaction contents; $P_2O_5$ assay of the polyphosphoric is desirably about 81% to about 84%.

Generally speaking, the time of adding the acid can vary from about two to about eight hours while keeping the temperature in a range of about 30° C. to about 60°

C. Temperatures much above about 60° C. should be avoided to prevent excessive hydrolysis of the polyphosphates to the undesirable orthophosphate stage.

So far as can be ascertained, the shift to the lower polyphosphate moieties is due primarily to the high ratio of alkali to acid which prevails during the initial phase of the neutralization. Of secondary importance are reactant feed rates and reaction temperature.

The alkali base is preferably a sodium or potassium alkali compound, most preferably, sodium or potassium hydroxide. Concentrated aqueous solutions of the alkali metal hydroxide are used, preferably at a concentration of about 40% to 50% by weight. This gives an aqueous solution containing about 50% alkali metal polyphosphate. A slight excess of base above that needed to neutralize the polyphosphoric acid is preferred, an excess of about 2% to 3% being satisfactory.

The sodium and potassium hydroxide solutions are desirably employed as a mixture of approximately equimolar proportions. Use of sodium hydroxide alone as the basis constituent may result in precipitation of sodium tripolyphosphate whereas an all potassium hydroxide is not cost effective. The 50/50 base mixture provides an aqueous solution, that is, both highly concentrated in polyphosphate anions and is economical to manufacture.

Reference is now made to the following examples.

EXAMPLE OF PRIOR ART

A concentrated polyphosphate solution was prepared using the reactants and quantities listed below:
115% polyphosphoric acid—10,650 grams
KOH, 45% solution—11,466 grams
NaOH, 50% solution—7,728 grams
Deionized water—4,959 grams The reaction apparatus consisted of a 10-gallon alkali feed tank of 316 stainless steel (13" inside diameter by 18" height) fitted with an electric motor driven propeller agitator. Similar tanks of the same construction were used for the acid feed and alkali feed systems. Stainless steel tubing ran from each of these tanks, through separate positive-displacement pumps for the metering of the acid and alkali reactants, and into the main recirculating loop, also made of stainless steel tubing. Downstream from the connection points of each of the reactant feed lines with the recirculating loop, there was placed a tube-and-shell heat exchanger, also constructed from stainless steel and of sufficient capacity to extract the heat generated from the combination of the acid and alkali reactants. Tap water from the laboratory water source made a once-through pass through the heat exchanger as the cooling fluid. The recirculating loop tubing continued out of the heat exchanger and into the open top of the product tank, also of the same size and construction as the two reactant feed tanks. From the bottom of this tank, the recirculating loop continued through a positive-displacement pump (used to maintain product movement within the recirculating loop) and then to the junction with the first reactant feed line, thus completing the recirculation loop. Side stream lines were run off at various locations, either for pressure relief safety devices or for drawing samples. Thermometers were placed in each of the tanks, and in-line within the recirculating loop at the inlet and outlet of the heat exchanger.

The KOH and NaOH solutions were added to the alkali feed tank and mixed, the polyphosphoric acid was added to the acid feed tank, and the water was added to the product tank. The loop pump was started to circulate the water through the recirculating loop. The feed line pumps were started and the pumping rates were adjusted to feed the KOH/NaOH mixture at a rate of 160 grams per minute, and the polyphosphoric acid at a rate of 89 grams per minute; the two feed rates were chosen so that the addition of each reactant would be completed in two hours. The flow of cooling water through the heat exchanger was regulated to keep the outlet temperature at a maximum of 40° C. Throughout the reaction, the reactants within their feed tanks remained at room temperature.

After reactant feeding was complete, the product was circulated through the reactor for an additional 30 minutes to bring it to room temperature. Circulation was then halted, and the product was drawn out of the product tank. Samples of the product and the polyphosphoric acid reactant were analyzed for percent $P_2O_5$ and for $P_2O_5$ distribution, the results of which are given below:

|  | Ortho | Pyro | Tripoly | Higher | % $P_2O_5$ |
|---|---|---|---|---|---|
| product | 4.8% | 19.3% | 19.2% | 56.7% | 25.5 |
| polyphosphoric acid | 5.7% | 19.7% | 18.7% | 55.9% | 83.8 |

These results show that the reaction using simultaneous reactant feeds as taught by the prior art yielded a product with a $P_2O_5$ distribution very similar to that of the polyphosphoric acid reactant.

EXAMPLES OF THE INVENTION

EXAMPLE 1

A concentrated polyphosphate solution was prepared using the reactants and quantities listed below:
115% polyphosphoric acid—3,550 grams
KOH, 45% solution—3,822 grams
NaOH, 50% solution—2,576 grams
Deionized water—1,653 grams These quantities were selected to produce a product batch of one-third the size of that produced in the previous example.

The same reaction apparatus was used as was described in the previous example, except that the acid feed line was rerouted so that the polyphosphoric acid would drop directly into the open end of the product tank, rather than enter into a closed section of the recirculating loop.

The KOH and NaOH solutions were added directly to the product tank, and the loop pump was started to circulate these mixed reactants through the recirculating loop. The alkali feed line was closed off from the recirculating loop with a valve. The feed rate of the polyphosphoric acid was adjusted so that the reaction would be completed in two hours. The water flow through the heat exchanger was adjusted so that the outlet temperature of the product did not exceed 40° C. During the course of the reaction, solids developed within the product so that the recirculating fluid became a slurry; however, all suspended solids redissolved into the product before the reaction was completed.

After the reaction was complete, the product was brought to room temperature, circulation was halted, and the product was drawn out of the product tank. Samples of the product and the polyphosphoric acid reactant were analyzed for percent $P_2O_5$ and $P_2O_5$ distribution, the results of which are given below:

|  | Ortho | Pyro | Tripoly | Higher | % $P_2O_5$ |
|---|---|---|---|---|---|
| product | 6.8% | 20.5% | 24.8% | 47.9% | 29.8 |
| polyphosphoric acid | 9.1% | 21.6% | 18.1% | 48.0% | 83.9 |

The water from the batch formula was afterwards added to the product, with no change in these properties.

These results show that the reaction in which the KOH and NaOH was added first, followed by the metered addition of the polyphosphoric acid reactant, yielded a product having a distribution of tripolyphosphate greater than that of the polyphosphoric acid reactant.

EXAMPLE 2

The procedure from Example 1 was repeated, with the exception that the polyphosphoric acid feed rate was adjusted so that the reaction would be completed in four hours. Samples of the product and the polyphosphoric acid reactant were analyzed for percent $P_2O_5$ and $P_2O_5$ distribution, the results of which are given below:

|  | Ortho | Pyro | Tripoly | Higher | % $P_2O_5$ |
|---|---|---|---|---|---|
| product | 7.4% | 21.2% | 26.3% | 45.0% | 29.8 |
| polyphosphoric acid | 4.9% | 16.9% | 17.4% | 60.8% | 83.6 |

The water from the batch formula was afterwards added to the product, with no change in these properties.

These results show that the reaction in which the KOH and NaOH was added first, followed by a slower metered addition of the polyphosphoric acid reactant, yielded a product having a distribution of pyrophosphate and tripolyphosphate greater than that of the polyphosphoric acid reactant.

EXAMPLE 3

The procedure from Example 2 was repeated, with the exception that the polyphosphoric acid feed rate was adjusted so that the reaction would be completed in two hours, and the water flow through the heat exchanger was adjusted so that the outlet temperature of the product did not exceed 30° C. Samples of the product and the polyphosphoric acid reactant were analyzed for percent P205 and P205 distribution, the results of which are given below:

|  | Ortho | Pyro | Tripoly | Higher | % $P_2O_5$ |
|---|---|---|---|---|---|
| product | 7.2% | 20.6% | 22.5% | 49.7% | 29.6 |
| polyphosphoric acid | 5.0% | 17.1% | 17.4% | 60.5% | 83.8 |

The water from the batch formula was afterwards added to the product, with no change in these properties.

These results show that the reaction in which the KOH and NaOH was added first, followed by a metered addition of the polyphosphoric acid reactant, and with greater cooling of the circulating fluid during the reaction, yielded a product having a distribution of pyrophosphate and tripolyphosphate greater than that of the polyphosphoric acid reactant.

EXAMPLE 4

The procedure from Example 2 was repeated, with the exception that the polyphosphoric acid feed rate was adjusted so that the reaction would be completed in four hours, and the water flow through the heat exchanger was adjusted so that the outlet temperature of the product did not exceed 30° C. Samples of the product and the polyphosphoric acid reactant were analyzed for percent $P_2O_5$ and $P_2)_5$ distribution, the results of which are given below:

|  | Ortho | Pyro | Tripoly | Higher | % $P_2O_5$ |
|---|---|---|---|---|---|
| product | 7.7% | 21.7% | 23.4% | 47.2% | 29.5 |
| polyphosphoric acid | 4.0% | 15.9% | 15.9% | 64.2% | 84.0 |

The water from the batch formula was afterwards add to the product, with no change in these properties.

These results show that the reaction in which the KOH and NaOH was added first, followed by a slower metered addition of the polyphosphoric acid reactant, and with greater cooling of the circulating fluid during the reaction, yielded a product having a pyrophosphate and tripolyphosphate distribution higher than that of the polyphosphoric acid reactant.

We claim:

1. In the process of preparing a concentrated aqueous polyphosphate solution by the neutralization reaction of polyphosphoric acid with an alkali metal base in aqueous media, the improvement of enriching the lower polyphosphate content of the polyphosphate solution by effecting a shift in the ratio of lower to higher polyphosphate moieties found in the acid to the lower members during the neutralization, comprising the addition of polyphosphoric acid having a $P_2)_5$ assay of from about 82.0% to about 85.0% to the entire contents of a stirred concentrated, aqueous base solution of sodium or potassium hydroxide at a temperature of from about 30° C. to about 60° C. over a time interval of about two to eight hours, the amount of aqueous alkali being slightly in excess of that for neutralizing the polyphosphoric acid and recovering a concentrated aqueous solution of enriched sodium and potassium lower polyphosphates.

2. The process of claim 1 wherein the aqueous base is about a 50% solution of a mixture of sodium and potassium hydroxide.

3. The process of claim 2 wherein the aqueous base solution contains about equimolar amounts of sodium and potassium hydroxide.

4. The process of claim 3 wherein the aqueous base contains 45% potassium hydroxide and 50% sodium hydroxide.

5. The process of claim 4 wherein the polyphosphoric acid is added over a period of about two hours at a reaction temperature of about 40° C.

6. The process of claim 4 wherein the polyphosphoric acid is added over a period of about four hours at a reaction temperature of about 40° C.

7. The process of claim 4 wherein the polyphosphoric acid is added over a period of about two hours at a reaction temperature of about 30°9 C.

8. The process of claim 4 wherein the polyphosphoric acid is added over a period of about four hours at a reaction temperature of 30° C.

9. The product obtained by the process of claim 1.

10. The product obtained by the process of claim 2.
11. The product obtained by the process of claim 3.
12. The product obtained by the process of claim 4.
13. The product obtained by the process of claim 5.
14. The product obtained by the process of claim 6.
15. The product obtained by the process of claim 7.
16. The product obtained by the process of claim 8.

* * * * *

UNITED STATES PATENT AND TRADEMARK OFFICE
CERTIFICATE OF CORRECTION

PATENT NO. : 5,035,871

DATED : July 30, 1991

INVENTOR(S) : Charles F. Sikorski and John W. DeMarco

It is certified that error appears in the above-identified patent and that said Letters Patent is hereby corrected as shown below:

Column 1, line 26, "phos®and" should --phos® and--. Column 2, line 56, "bought" should read --brought--. Column 3, line 21, "basis" should read --basic--. Column 5, line 54, "P2O5 and P2O5" should read --$P_2O_5$ and $P_2O_5$--. Column 6, line 15, "P2)5" should read --$P_2O_5$--; line 43, "P2)5" should read --$P_2O_5$--. Column 7, line 3, "30°9C." should read --30°C.--.

Signed and Sealed this

Twenty-second Day of December, 1992

Attest:

DOUGLAS B. COMER

Attesting Officer     Acting Commissioner of Patents and Trademarks